US012676562B2

(12) United States Patent
Yu et al.

(10) Patent No.: US 12,676,562 B2
(45) Date of Patent: Jul. 7, 2026

(54) CARRIER PHASE CONTROL FOR POLYPHASE RECTIFIER OR INVERTER

(71) Applicant: AcLeap Power Inc., Taipei City (TW)

(72) Inventors: Qixue Yu, Shanghai (CN); Ting He, Shanghai (CN); Juan Zhang, Shanghai (CN); Kun Dou, Shanghai (CN)

(73) Assignee: OmniOn Power Technology GmbH, Baden (CH)

( * ) Notice: Subject to any disclaimer, the term of this patent is extended or adjusted under 35 U.S.C. 154(b) by 168 days.

(21) Appl. No.: 18/468,157

(22) Filed: Sep. 15, 2023

(65) Prior Publication Data

US 2024/0106355 A1 Mar. 28, 2024

(30) Foreign Application Priority Data

Sep. 16, 2022 (CN) .......................... 202211130070.X

(51) Int. Cl.
*H02M 7/5395* (2006.01)
*H02M 1/12* (2006.01)
*H02M 1/44* (2007.01)

(52) U.S. Cl.
CPC ......... *H02M 7/5395* (2013.01); *H02M 1/123* (2021.05); *H02M 1/44* (2013.01)

(58) Field of Classification Search
CPC .............................................. H02M 7/02–7/40
See application file for complete search history.

(56) References Cited

U.S. PATENT DOCUMENTS

2020/0235655 A1* 7/2020 Hayashi .................... H02J 9/06
2023/0336092 A1* 10/2023 Toyoda ............... H02M 7/4837

FOREIGN PATENT DOCUMENTS

JP 6968315 B1 11/2021

* cited by examiner

*Primary Examiner* — Peter M Novak
(74) *Attorney, Agent, or Firm* — CKC & Partners Co., LLC

(57) ABSTRACT

Embodiments of the present disclosure provide a method for controlling a converter and a converter system. The method includes obtaining voltage signals indicating phase voltages of three phases at AC side of a converter, determining, based on the voltage signals, carrier signals of a three-phase switching branches of the converter, wherein carrier signals of two of three phases have the same phase with each other and have a different phase from a carrier signal of the rest phase of the three phases, and magnitude of a phase voltage of the rest phase is between the phase voltages of the two phases, and generating, based on the determined carrier signals and modulation wave signals of the three-phase switching branches, control signals of the three-phase switching branch.

18 Claims, 13 Drawing Sheets

900

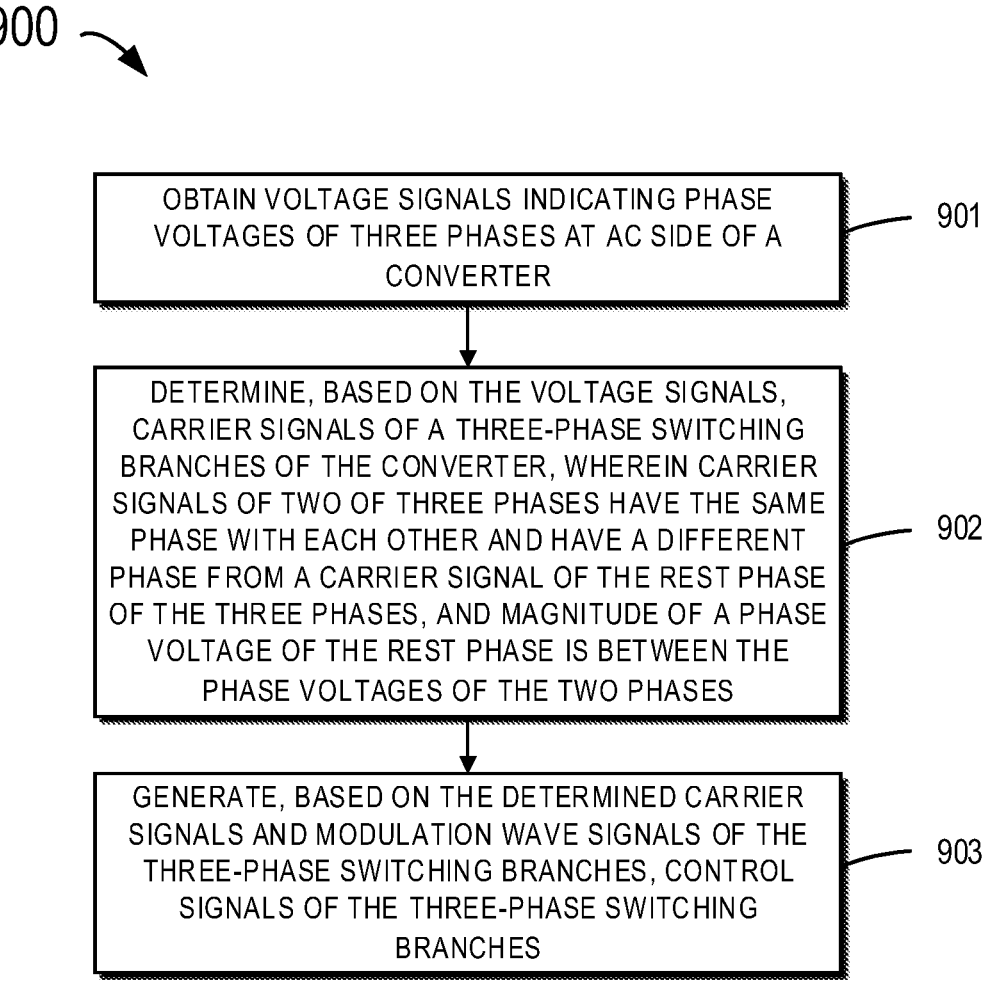

OBTAIN VOLTAGE SIGNALS INDICATING PHASE
VOLTAGES OF THREE PHASES AT AC SIDE OF A
CONVERTER
— 901

DETERMINE, BASED ON THE VOLTAGE SIGNALS,
CARRIER SIGNALS OF A THREE-PHASE SWITCHING
BRANCHES OF THE CONVERTER, WHEREIN CARRIER
SIGNALS OF TWO OF THREE PHASES HAVE THE SAME
PHASE WITH EACH OTHER AND HAVE A DIFFERENT
PHASE FROM A CARRIER SIGNAL OF THE REST PHASE
OF THE THREE PHASES, AND MAGNITUDE OF A PHASE
VOLTAGE OF THE REST PHASE IS BETWEEN THE
PHASE VOLTAGES OF THE TWO PHASES
— 902

GENERATE, BASED ON THE DETERMINED CARRIER
SIGNALS AND MODULATION WAVE SIGNALS OF THE
THREE-PHASE SWITCHING BRANCHES, CONTROL
SIGNALS OF THE THREE-PHASE SWITCHING
BRANCHES
— 903

Fig. 9

Phase-A modulation wave and carrier

Phase-B modulation wave and carrier

Phase-C modulation wave and carrier

Phase-A driving signal

Phase-B driving signal

Phase-C driving signal

+VBUS/6

0

-VBUS/6

220

1500A

1500B

1500C

1600

1700

CARRIER PHASE CONTROL FOR POLYPHASE RECTIFIER OR INVERTER

CROSS REFERENCE TO RELATED APPLICATIONS

This patent application claims the benefit and priority of Chinese Patent Application No. 202211130070.X filed on Sep. 16, 2022, the disclosure of which is incorporated by reference herein in its entirety as part of the present application.

BACKGROUND

Embodiments of the present disclosure relate to the field of power electronics, and more specifically, to a method for controlling converter and a converter system.

Converters can convert electrical power into appropriate forms suitable for grid or user use. For example, converters may convert AC power into DC power as rectifiers, and convert DC power into AC power as inverters. Some converters also may switch between rectifier and inverter as required to implement energy transmission in two directions. On account of the above features, converters are extensively applied to convert various power in many fields, such as motor driver, grid-connected power converter, power converter of renewable energy and the like.

Converters in operation may generate common-mode (CM) noise. Such common-mode noise not only leads to severe electromagnetic interference (EMI) issues, but also breaks down the insulation, damages the converter and even causes electric shock to people. The reliability and safety of the converter operation are thus seriously compromised.

BRIEF DESCRIPTION

Embodiments of the present disclosure provide a control method for a converter and a converter system in accordance with example implementations of the present disclosure.

A first aspect of the present disclosure provides a method for controlling converters. The method includes obtaining voltage signals indicating phase voltages of three phases at AC side of a converter, determining, based on the voltage signals, carrier signals of a three-phase switching branches of the converter, wherein carrier signals of two of three phases have the same phase with each other and have a different phase from a carrier signal of the rest phase of the three phases, and magnitude of a phase voltage of the rest phase is between the phase voltages of the two phases, and generating, based on the determined carrier signals and modulation wave signals of the three-phase switching branches, control signals of the three-phase switching branches.

In some embodiments of the present disclosure, a difference between phase of the carrier signals of the two of the three phases and phase of the carrier signal of the rest phase is within a range from 150 degrees to 210 degrees.

In some embodiments of the present disclosure, the difference between the phase of the carrier signals of the two of the three phases and the phase of the carrier signal of the rest phase is 180 degrees.

In some embodiments of the present disclosure, determining, based on the voltage signals, the carrier signals of the three-phase switching branches of the converter includes comparing, based on the voltage signals, phase voltages of the three phases, and for a first phase switching branch in response to a phase voltage of a second phase being greater than that of a third phase, determining a first carrier signal as a carrier signal of the first phase switching branch, or in response to the phase voltage of the second phase being no greater than that of the third phase, determining a second carrier signal as the carrier signal of the first phase switching branch, where the second carrier signal and the first carrier signal are in different phases with respect to each other, for a second phase switching branch in response to the phase voltage of the third phase being greater than that of a first phase, determining the first carrier signal as a carrier signal of the second phase switching branch, or in response to the phase voltage of the third phase being no greater than that of the first phase, determining the second carrier signal as the carrier signal of the second phase switching branch, for a third phase switching branch in response to the phase voltage of the first phase being greater than that of a second phase, determining the first carrier signal as a carrier signal of the third phase switching branch, or in response to the phase voltage of the first phase being no greater than that of the second phase, determining the second carrier signal as the carrier signal of the third phase switching branch.

In some embodiments of the present disclosure, determining, based on the voltage signals, the carrier signals of the three-phase switching branches of the converter includes for a switching branch of each phase in response to a phase voltage corresponding to the switching branch of this phase among the phase voltages of the three phases being declining, determining a first carrier signal as a carrier signal of the switching branch of this phase, or in response to the phase voltage corresponding to the switching branch of this phase being not declining, determining a second carrier signal as the carrier signal of the switching branch of this phase, where the second carrier signal and the first carrier signal are in different phases with respect to each other.

In some embodiments of the present disclosure, obtaining the voltage signals indicating the phase voltages of the three phases at the AC side of the converter includes obtaining modulation wave signals of the three-phase switching branches as the voltage signals indicating the phase voltages of the three phases.

In some embodiments of the present disclosure, obtaining the voltage signals indicating the phase voltages of the three phases at the AC side of the converter includes obtaining sensing signals of AC-side supply voltage of the converter as the voltage signals indicating the phase voltages of the three phases.

In some embodiments of the present disclosure, the converter is a rectifier and wherein the modulation wave signals are determined based on a DC side voltage, an AC side supply voltage, and an AC side inductive current of the rectifier.

In some embodiments of the present disclosure, generating, based on the determined carrier signals and the modulation wave signals of the three-phase switching branches, the control signals of the three-phase switching branches includes generating, based on a comparison between the determined carrier signals and the modulation wave signals, pulse-width modulated signals as the control signals of the three-phase switching branches.

A second aspect of the present disclosure provides a converter system. The converter system includes a converter, and a control device for controlling the converter, where the control device is configured to execute the method according to the first aspect.

It should be appreciated that the contents described in this disclosure are not intended to identify key or essential features of the implementations of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages, and aspects of various implementations of the present disclosure will become more apparent. In the drawings, the same or similar reference signs indicate same or similar elements, wherein:

FIG. 9 illustrates a schematic flowchart of a control method for the converter in accordance with embodiments of the present disclosure;

DETAILED DESCRIPTION

The implementations of the present disclosure will be described below in more details with reference to the drawings. Although the drawings illustrate some implementations of the present disclosure, it should be appreciated that the present disclosure can be implemented in various manners and should not be limited to the implementations explained herein. On the contrary, the implementations are provided to enable those skilled in the art to understand the present disclosure more thoroughly and completely. It should be appreciated that the drawings and implementations of the present disclosure are exemplary only and are not intended for restricting the protection scope of the present disclosure.

In the description of implementations disclosed herein, the term "includes" or "comprise" and its similar expressions are to be read as open-ended terms that mean "includes, but is not limited to." The term "based on" is to be read as "based at least in part on." The terms "one example embodiment/implementation" and "this embodiment/implementation" are to be read as "at least one embodiment/implementation." The terms "first", "second" and so on can refer to same or different objects. The following text also can include other explicit and implicit definitions.

As stated above, common-mode noises may be generated during the operation of the converters, and this common-mode noises would lead to EMI issues and reduce reliability of converters. The present disclosure provides an improved control solution for converters. By means of controlling a carrier phase of a particular phase of the three phases, the common-mode voltage during the operation of the converter can be significantly decreased, thereby reducing the common-mode noise and improving the systematic reliability.

Figure 1:
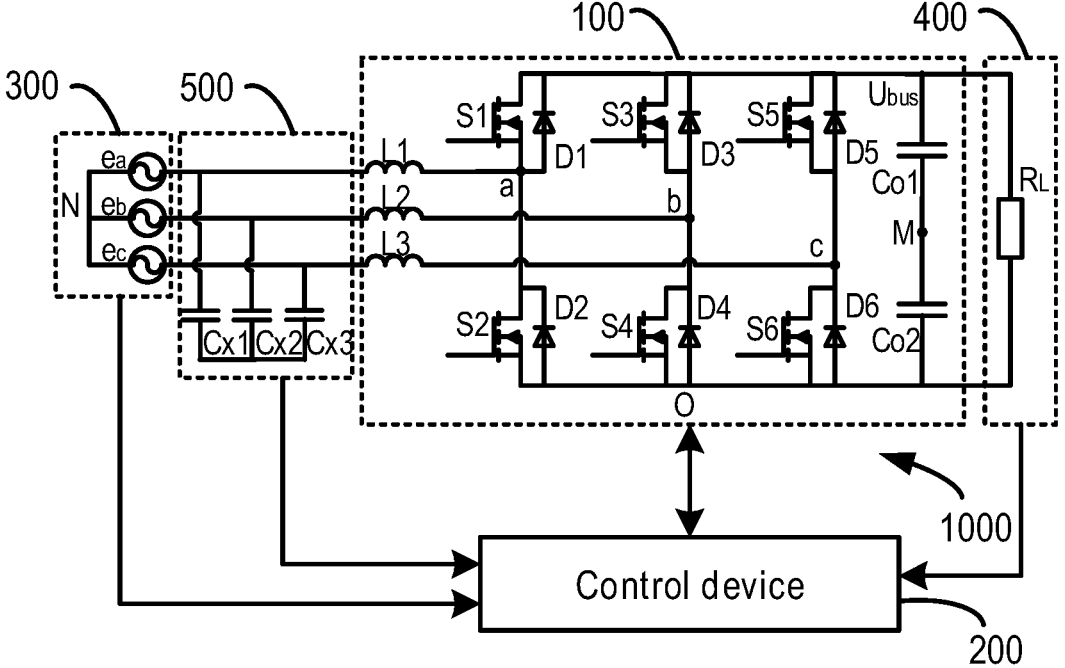
FIG. 1 illustrates a first scenario in which embodiments of the present disclosure can be implemented.

FIG. 1 illustrates a first scenario where embodiments of the present disclosure may be implemented. In the first scenario, a converter system 1000 may receive, via a filter 500, an AC power from a three-phase AC power supply 300 and convert the AC power into DC power, which DC power is provided to a DC loading unit 400. In other words, the converter system 1000 may fulfill the rectification function in the first scenario.

The converter system 1000 includes a converter 100. The converter 100 includes a first phase switching branch (also known as phase-A switching branch) consisting of switching devices S1 and S2, a second phase switching branch (also known as phase-B switching branch) consisting of switching devices S3 and S4, and a third phase switching branch (also known as phase-C switching branch) consisting of switching devices S5 and S6. The switching devices S1 to S6 may be respectively provided with freewheel diodes D1 to D6 anti-parallel connected thereto. The switching devices S1 to S6 include, but not limited to, Insulated Gate Bipolar Translator (IGBT), Junction Field-Effect Transistor (JFET), Bipolar Junction Transistor (BJT), Metal-Oxide-Semiconductor Field Effect Transistor (MOSFET), Gate Turn Off thyristor, (GTO), MOS-Controlled Thyristor (MCT), Integrated Gate-Commutated Thyristor (IGCT), Silicon Carbide (SiC) switching device or Gallium Nitride (GaN) switching device and other power switching devices. The freewheel diodes D1 to D6 may be inherent body diodes of the switching devices or alternatively diode devices configured independent of the switching devices. Besides, the converter 100 also includes inductors L1 to L3 located at AC side and capacitors Co1 and Co2 located at DC side. The inductors L1, L2, and L3 are respectively provided at the first phase, the second phase, and the third phase of the AC side, and the capacitors Co1 and Co2 are bridged over a bus of the DC side. During the operation of the converter 100, the inductors L1, L2, and L3 and the capacitors Co1 and Co2 may implement voltage-stabilizing, filtering, and energy storage functions.

The converter system 1000 also includes a control device 200, which control device 200 may be implemented in various ways. For example, the control device 200 may be implemented in the form of a controller with computing and processing capacity, or an analog circuit and/or a digital circuit, or combinations thereof. The control device 200 may receive sensing signals, e.g., voltage and current sensing signals, from the converter 100, the three-phase AC power supply 300, the DC loading unit 400, and the filter 500 according to the needs and generate, based on the received sensing signals, control signals or driving signals for controlling the switching devices S1 to S6 of the converter 100 to turn on and off the switching devices S1 to S6. Therefore, the AC power of the three-phase AC power supply 300 is converted into the DC power required for the DC loading unit 400.

The three-phase AC power supply 300 in the first scenario may be a public grid or other suitable types of three-phase power supply, and for example may include a first phase power supply $e_a$, a second phase power supply $e_b$, and a third phase power supply $e_c$ with staggered phase. The DC loading unit 400 includes a load $R_L$. In addition, the filter 500 may prevent harmonics generated by the converter 100 from flowing into the public grid or affecting the three-phase AC power supply 300. For example, the filter 500 may include capacitors Cx1 to Cx3, wherein the capacitor Cx1 is provided on the first phase, the capacitor Cx2 is provided on the second phase, and the capacitor Cx3 is provided on the first phase.

Figure 2:
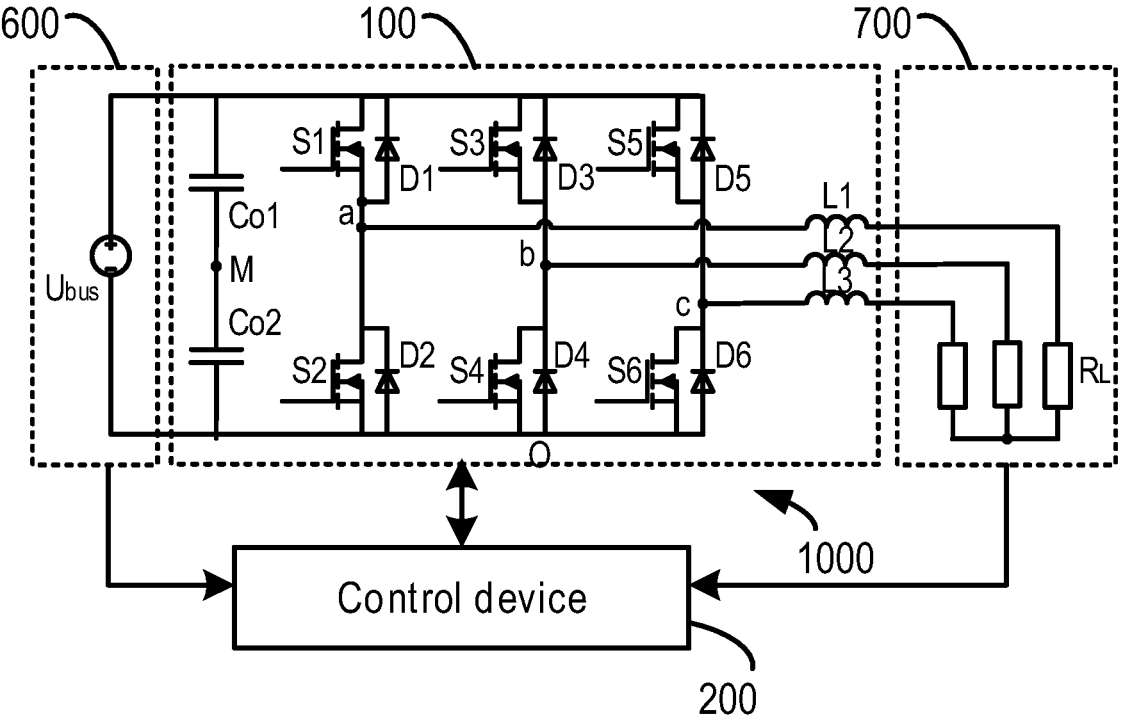
FIG. 2 illustrates a second scenario in which embodiments of the present disclosure can be implemented.

FIG. 2 illustrates a second scenario in which embodiments of the present disclosure can be implemented. In the second scenario, the converter system 1000 may convert the DC power from a DC power supply 600 into AC power, which AC power is provided to an AC loading unit 700. In other words, the converter system 1000 may fulfill the inverter function in the second scenario. In the inverting operation, the control device 200 in the converter system 1000 may receive sensing signals, e.g., voltage and current sensing signals, from the converter 100, the DC power supply 600 and the AC loading unit 700 according to the needs and generate, based on the received sensing signals, control signals or driving signals for controlling the switching devices S1 to S6 of the converter 100 to turn on and off the switching devices S1 to S6. Therefore, the DC power of the DC power supply 600 is converted into the AC power required by the AC loading unit 700. Other configurations of the converter system 1000 in FIG. 2 are similar to FIG. 1 and will not be repeated here.

The control process of the converter system 1000 is to be described in the first scenario of FIG. 1 as an example. However, it is to be appreciated that the control process of the converter system 1000 also may be adaptively adjusted and further applied to the second scenario in FIG. 2.

Figure 3:
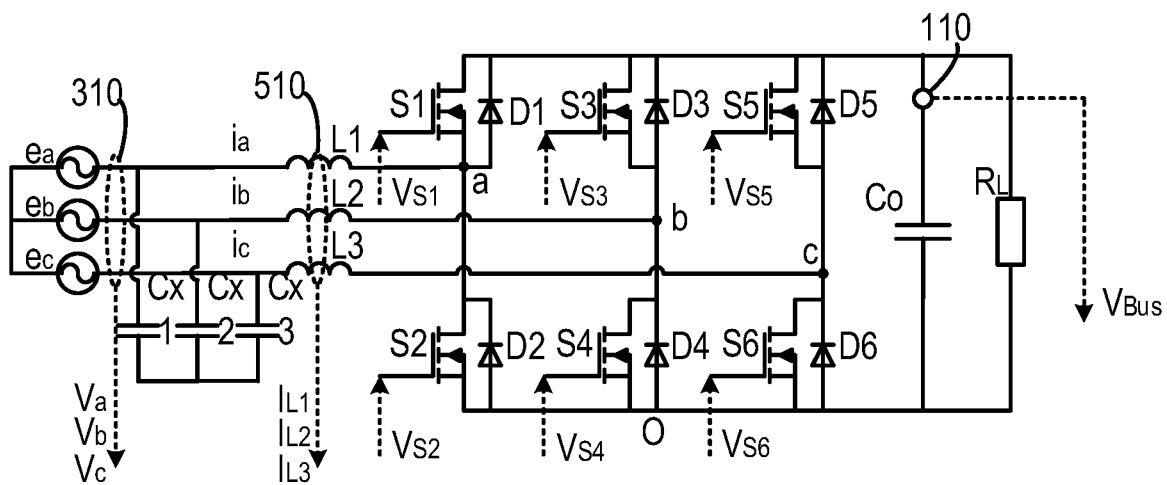
FIG. 3 illustrates a schematic diagram of the converter and related circuitry in the first scenario in accordance with embodiments of the present disclosure.
Figure 4:
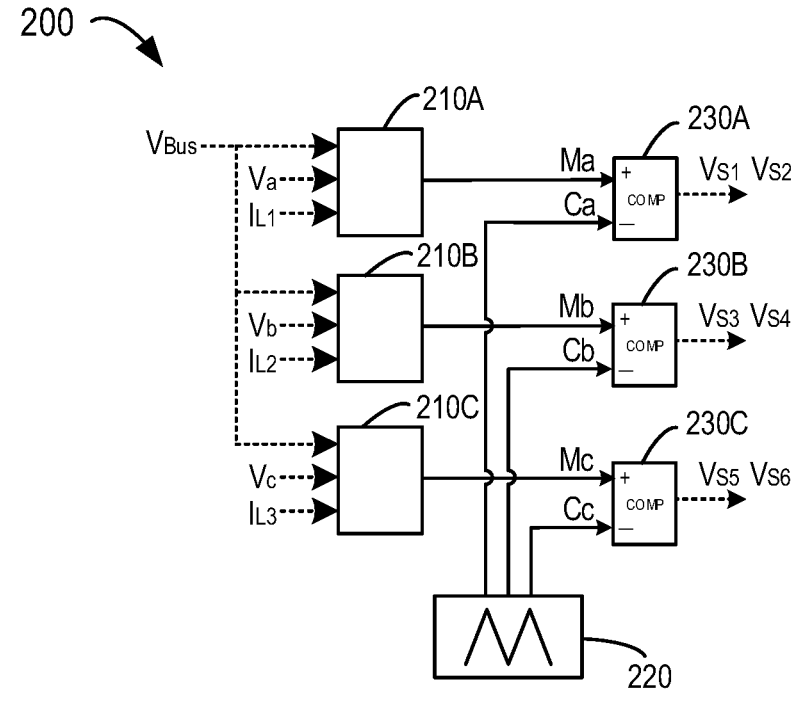
FIG. 4 illustrates a schematic block diagram of the control device of the converter system in accordance with embodiments of the present disclosure.

FIG. 3 illustrates a schematic diagram of the converter 100 and related circuitry in the first scenario in accordance with embodiments of the present disclosure, and FIG. 4 shows a schematic block diagram of the control device 200 of the converter system 1000 in accordance with embodiments of the present disclosure. As shown in FIGS. 3 and 4, the control device 200 may receive sensing signals from the sensing devices 110, 310, and 510. The sensing signal $V_{Bus}$ from the sensing device 110 indicates a DC-side bus voltage of the converter 100, sensing signals $V_a$, $V_b$, and $V_c$ from the sensing device 310 respectively indicate the phase voltage of the first phase (i.e., phase-A voltage), the phase voltage of the second phase (i.e., phase-B voltage) and the phase voltage of the third phase (i.e., phase-C voltage) output to the converter system 1000 from the three-phase AC power supply 300, and sensing signals $I_{L1}$, $I_{L2}$, and $I_{L3}$ from the sensing device 510 respectively indicate inductive currents flowing through the inductors L1, L2, and L3. The control device 200 may generate, based on the received sensing signals, driving signals $V_{s1}$ to $V_{s6}$. The driving signals $V_{s1}$ and $V_{s2}$ are separately provided to gates of the switching devices S1 and S2 of the first phase switching branch, to control ON and OFF of the switching devices S1 and S2. The driving signals $V_{s3}$ and $V_{s4}$ are separately provided to gates of the switching devices S3 and S4 of the second phase switching branch, to control ON and OFF of the switching devices S3 and S4. The driving signals $V_{s5}$ and $V_{s6}$ are separately provided to gates of the switching devices S5 and S6 of the third phase switching branch, to control ON and OFF of the switching devices S5 and S6. The control device 200 may include a modulation wave generating module 210A for the first phase (i.e., phase A), a modulation wave generating module 210B for the second phase (i.e., phase B), and a modulation wave generating module 210C for the third phase (i.e., phase C).

Figure 5:
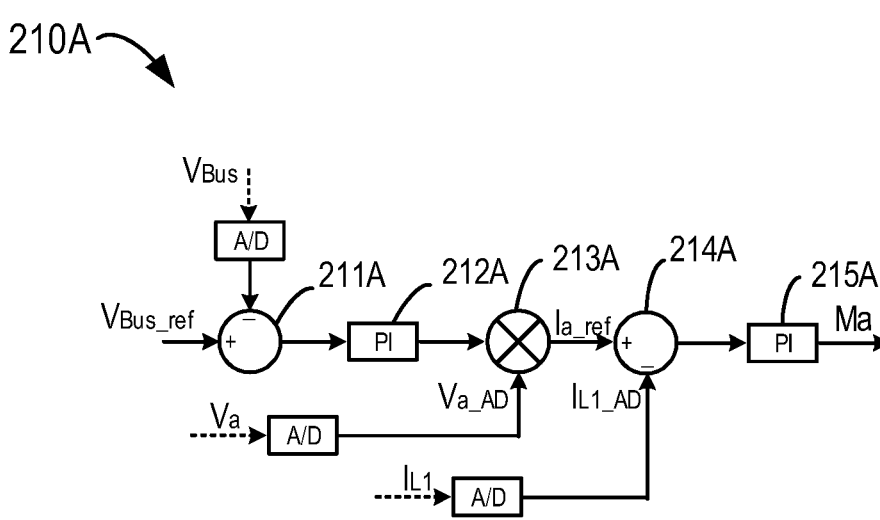
FIG. 5 illustrates a schematic block diagram of the modulation wave generating module in a control device in accordance with embodiments of the present disclosure.

FIG. 5 illustrates a schematic block diagram of the modulation wave generating module 210A in a control device 200 in accordance with embodiments of the present disclosure. As shown, the module 210A includes a difference calculating unit 211A, a proportional-integral (PI) unit 212A, a product unit 213A, a difference calculating unit 214A, and a PI unit 215A.

To be specific, the sensing signal $V_{Bus}$ from the sensing device 110 is digital-to-analog converted (A/D conversion) and then input to the difference calculating unit 211A of the module 210A and a difference operation is performed at the difference calculating unit 211A between the digital-to-analog converted sensing signal and the reference voltage $V_{Bus\_ref}$ of the DC-side bus, wherein the reference voltage $V_{Bus\_ref}$ represents a bus voltage expected to be output to the DC load at the DC side of the converter 100. Then, the difference calculating unit 211A provides the difference value to the PI unit 212A. A closed-loop control is formed for the DC bus voltage through the difference calculating unit 211A and the PI unit 212A, to ensure that the DC voltage output by the converter 100 can track or reach the expected reference voltage $V_{Bus\_ref}$. Furthermore, the signal processed via the PI unit 212A is provided to the product unit 213A, and a multiplication operation is performed at the product unit 213A between the processed signal and the A/D converted sensing signal $V_a$. The product unit 213A provides the output $I_{a\_ref}$ of the multiplication operation to the difference calculating unit 214A. A difference operation is implemented between the output $I_{a\_ref}$ and the A/D converted sensing signal $I_{L1}$ at the difference calculating unit 214A. The difference value output by the difference calculating unit 214A is provided to the PI unit 215A to generate the modulation wave signal Ma. A closed-loop control may be formed for inductive currents represented by the sensing signal $I_{L1}$ via the product unit 213A, the difference calculating unit 214A and the PI unit 215A, to ensure that the inductive currents can track or reach the same phase as the AC power supply voltage, thereby further decreasing or eliminating the phase difference between the voltage and the current output by the AC power supply and realizing power factor correction.

Modules 210B and 210C may be similar to the module 210A and will not be repeated. However, the sum of the voltages of three phases is zero and the modulation wave of one phase may be calculated by the modulation waves of the rest two phases. As such, in some embodiments, one of the modules 210A, 210B, and 210C can be omitted. In other words, only the modulation wave generating modules of two phases are present and the modulation wave of the remaining phase may be derived from the two-phase modulation wave generated by the modulation wave generating modules of these two phases. In such case, the sensing devices 310 and 510 in FIG. 3 may sense and provide just two-phase voltage and two-phase current.

Returning to FIG. 4, the signal Ma output by the module 210A is output to a comparison module 230A as the modulation wave signal. In the comparison module 230A, the modulation wave signal Ma is compared with a carrier signal and driving signals are output to an upper arm switching device S1 and a lower arm switching device S2 of the first phase switching branch respectively. Likewise, the modules 210B and 210C would compare the corresponding modulation waves Mb and Mc with the carrier signals and output driving signals to the switching devices S3 and S4 of the second phase switching branch and driving signals to the switching devices S5 and S6 of the third phase switching branch. Hence, the converter 100 is controlled by pulse-width modulation (PWM).

To clearly explain the object of the embodiments of the present disclosure, the conventional PWM approach is to be depicted below.

Figure 6:
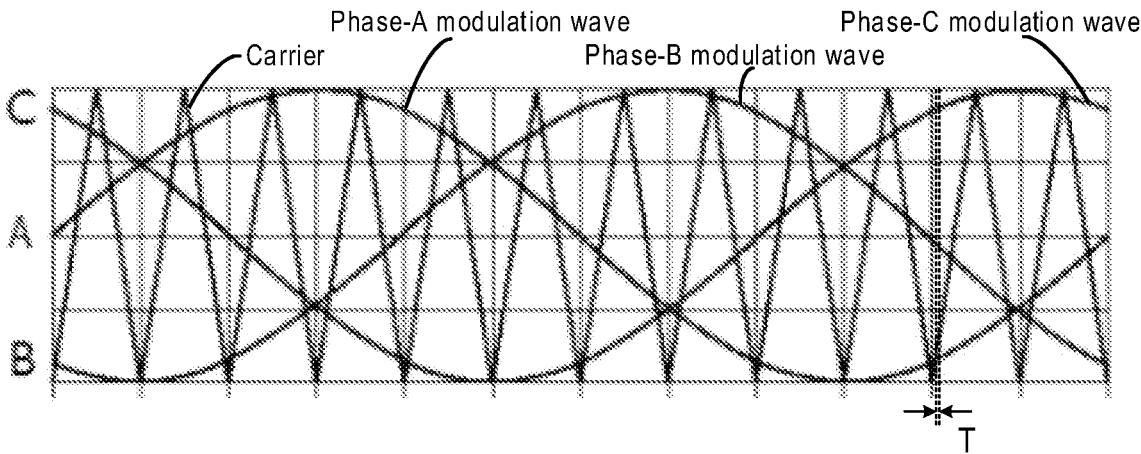
FIG. 6 illustrates a waveform of modulation waves and carrier waves in the conventional scheme of pulse-width modulation.

FIG. 6 illustrates a waveform of modulation waves and carrier waves in the conventional scheme of PWM. As shown, phase-A modulation wave, phase-B modulation wave and phase-C modulation wave are compared with the same triangular carrier to generate PMW signals, thereby turning on and off the switching devices of the three-phase switching branches. It is to be noted that the frequency of the carrier illustrated in FIG. 6 is just demonstrative and the carrier frequency of the PWM usually is up to kilohertz or hundreds of kilohertz, which is much higher than the frequency of the modulation wave (e.g., 50 Hz or 60 Hz). Thus, a single modulation wave period may go through hundreds to even tens of thousands of carrier periods.

Figure 7A:
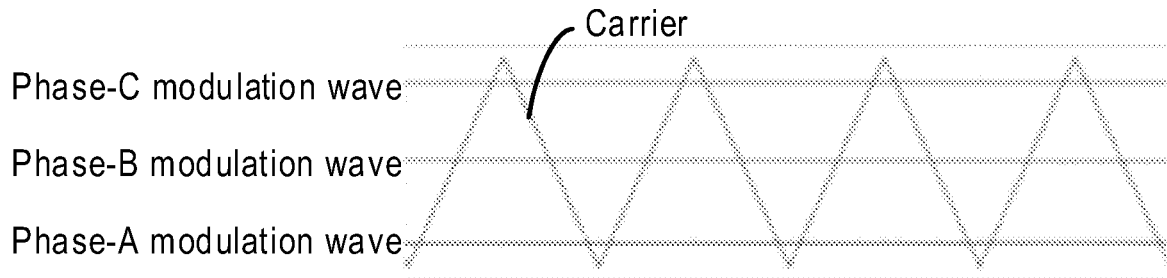
FIG. 7A illustrates an enlarged waveform of modulation waves and carrier waves in the conventional scheme of pulse-width modulation at a local period of time.
Figure 7B:
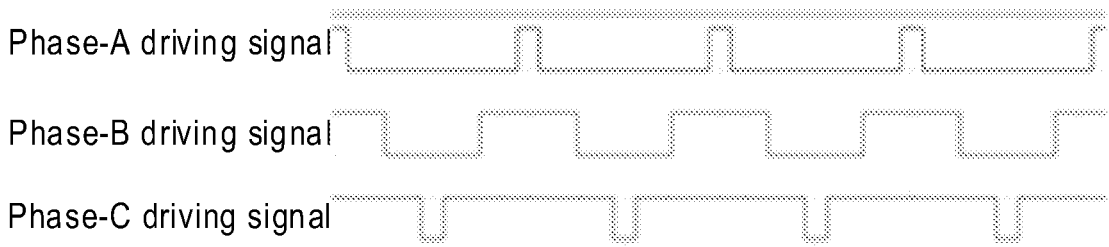
FIG. 7B illustrates a waveform of driving signals in the conventional scheme of pulse-width modulation.

FIG. 7A illustrates an enlarged waveform of modulation waves and carrier waves in FIG. 6 at a local period of time and FIG. 7B illustrates a waveform of driving signals corresponding to FIG. 7A. The time period shown in FIGS. 7A and 7B for example may correspond to T time period in FIG. 6. Phase A here is described as an example. The phase-A modulation wave is compared with the triangular wave. When the phase-A modulation wave is greater than the carrier wave, a high-level phase-A driving signal is generated, and when the phase-A modulation wave is lower than the carrier wave, a low-level phase-A driving signal is generated, where the high-level driving signal turns on the switching devices and the low-level driving signal turns off the switching devices. The generated phase-A driving signal will be provided to the gate of the upper arm switching device S1 of the phase-A switching branch to turn on or off the switching device S1, whereas an inverse signal of the phase-A driving signal will be provided to the gate of the lower arm switching device S2 of the phase-A switching branch, to connect or disconnect the switching device S2. Driving signals for phase B and phase C are generated in a similar way and separately provided to the gate of the switching devices S3 and S4 of the phase-B switching branch and gate of the switching devices S5 and S6 of the phase-C switching branch, so as to control ON and OFF of the switching devices. In this way, the converter is controlled to perform rectification or inverter operations.

However, common-mode noises are generated during the operation procedure of the converter and would compromise reliability and safety of the converter. Usually, the common-mode noises can be reduced or suppressed using a common-mode filter having a common-mode choker and a common-mode capacitor. However, size and weight of the common-mode filter basically depends on magnetic saturation of the magnetic core of the choker, while the magnetic saturation of the magnetic core of the choker is heavily affected by the common-mode voltage.

In the three-phase converter, the common-mode voltage is defined as a three-phase instantaneous average voltage value. Besides, in the scenarios illustrated by FIGS. 1 and 2, the common-mode voltage Vim may be defined by the following equation:

$$V_{cm} = \frac{1}{3}(V_{aM} + V_{bM} + V_{cM}) \tag{1}$$

Where $V_{aM}$ an instantaneous voltage between a point "a" of the phase-A switching branch and a midpoint "M" of a DC capacitor branch, $V_{bM}$ represents an instantaneous voltage between a point "b" of the phase-B switching branch and a midpoint "M" of a DC capacitor branch, and $V_{cM}$ indicates an instantaneous voltage between a point "c" of the phase-C switching branch and a midpoint "M" of a DC capacitor branch.

The common-mode voltages of the converter under different switching states are demonstrated in the table below, wherein for the upper arm switching device state (S1, S3, S5), 1 and 0 respectively indicate that the corresponding switching device is ON or OFF. For example, (0, 0, 0) represents that S1, S3, and S5 are all switched off, (1, 0, 0) indicates that S1 is turned on while S3 and S5 are turned off. Besides, the states of the lower arm switching device and the upper arm switching device are complimentary with each other. Thus, the states of all switching devices S1 to S6 may be characterized by the upper arm switching device state (S1, S3, S5).

TABLE 1

| State of upper arm switching device (S1, S3, S5) | Common-mode voltage | State of upper arm switching device (S1, S3, S5) | Common-mode voltage |
|---|---|---|---|
| (0, 0, 0) | $-U_{bus}/2$ | (1, 0, 0) | $-U_{bus}/6$ |
| (0, 0, 1) | $-U_{bus}/6$ | (1, 0, 1) | $U_{bus}/6$ |
| (0, 1, 0) | $-U_{bus}/6$ | (1, 1, 0) | $U_{bus}/6$ |
| (0, 1, 1) | $U_{bus}/6$ | (1, 1, 1) | $U_{bus}/2$ |

According to the above table, when (S1, S3, S5) is (0, 0, 0), the common-mode voltage reaches $-U_{bus}/2$, and when (S1, S3, S5) is (1, 1, 1), the common-mode voltage arrives at $U_{bus}/2$. In other words, when the upper arm switching devices S1, S3, and S5 are all turned off or on, the absolute value of the common-mode voltage is at the maximum level, i.e., $U_{bus}/2$.

Figure 8:
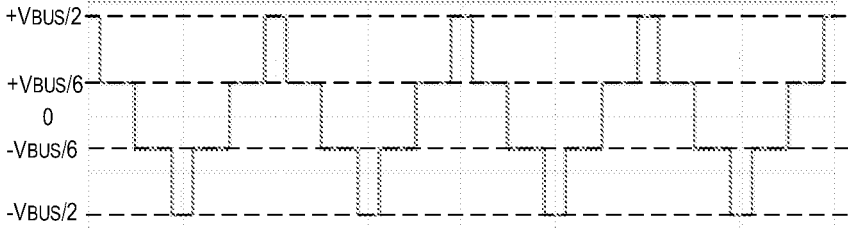
FIG. 8 illustrates a waveform of the common-mode voltage in the conventional scheme of pulse-width modulation.

FIG. 8 illustrates a waveform of the common-mode voltage corresponding to FIGS. 7A and 7B. As shown in FIG. 8, at the time period when the driving signals of phases A, B, and C are all at high level or low level, i.e., (S1, S3, S5) being (0, 0, 0) or (1, 1, 1), the maximum common-mode voltage of ±$U_{bus}$/2 occurs. However, during other periods of time, the common-mode voltage is merely ±$U_{bus}$/6. Accordingly, the time periods when the switching state is (0, 0, 0) or (1, 1, 1) remarkably increase the common-mode voltage. An excessively high common-mode voltage would lead to severe common-mode noises, which may cause the EMI issues and possibly insulation breakdown. The reliability of the converter is accordingly compromised. In addition, the excessively high common-mode voltage amplitude also may increase size and weight of the common-mode filter and put a higher demand on the insulation performance of the related devices. Thus, the system overhead is increased.

To address these issues, embodiments of the present disclosure provide an improved control solution for the converter. In the improved solution, the carrier of a particular phase of the three phases is subject to phase shift, to eliminate or reduce the period of time when the upper arm switching devices or the lower arm switching devices are all turned on or off during the operation of the converter. The common-mode voltage during the operation of the converter is significantly reduced. Hence, systematic reliability and safety are improved, the insulation requirements for related devices are lowered and the common-mode filter is downsized.

FIG. 9 illustrates a schematic flowchart of a control method 900 for the converter 100 in accordance with embodiments of the present disclosure. The method 900 may be implemented in the scenarios of FIGS. 1 and 2 and executed by the control device 200 of the converter system 1000. It is to be understood that the above respective aspects illustrated in FIGS. 1 to 5 are applicable to the method 900. For the sake of discussion, the method 900 is to be described with reference to FIGS. 1-5.

At block 901, the control device 200 obtains a voltage signal indicating the phase voltage of the three phases at the AC side of the converter 100.

As an example, the control device 200 may include a carrier generating module 220 (with reference to FIG. 4), and the voltage signal indicating the phase voltages of the three phases at the AC side may be input to the carrier generating module 220 of the control device 200.

In some embodiments of the present disclosure, the control device 200 obtains modulation wave signals Ma, Mb, and Mc of the three-phase switching branch as the voltage signals indicating the phase voltages of the three phases at the AC side of the converter 100. Specifically, the modulation wave signals Ma, Mb, and Mc in fact represent the phase voltages of the three phases to be acquired by the converter 100 at its AC side. Therefore, the modulation wave signals Ma, Mb, and Mc can act as the voltage signals indicating the phase voltages of the three phases at the AC side of the converter 100.

In some embodiments of the present disclosure, the control device 200 obtains sensing signals $V_a$, $V_b$, and $V_c$ of the supply voltage at the AC side of the converter 100 as the voltage signals indicating the phase voltages of the three phases. To be specific, during the control process illustrated by FIGS. 3 to 5, the closed-loop control over the inductive currents by the control device 200 enables the three-phase voltage (i.e., voltage at points a, b, and c of the three-phase switching branch) at the AC side of the converter 100 to have the same phase as the voltage output by the AC-side power supply $e_a$, $e_b$, and $e_c$ of the converter 100. Hence, the sensing signals $V_a$, $V_b$, and $V_c$ of the supply voltage at the AC side may directly act as the signals representing the phase voltages of the three phases at the AC side.

At block 902, the control device 200 determines, based on the obtained voltage signals, the carrier signals of the three-phase switching branch of the converter 100, wherein the carrier signals of the two of the three phases have the same phase with each other and have a different phase from the carrier signal of the rest phase of the three phases. In addition, the magnitude of the phase voltage of the rest phase is between the phase voltages of the two phases.

As an example, the carrier generating module 220 of the control device 200 may determine, according to the acquired voltage signals indicating the phase voltages of the three phases, the magnitudes of the phase voltages for phase A, phase B, and phase C, and further designate the carrier signals based on the magnitudes of the respective phase voltages. For example, if the current value of the phase voltage of phase B (e.g., current value of the modulation wave of phase B or current value of the power supply of phase B) is smaller than the current value of the phase voltage of phase A and greater than the current value of the phase voltage of phase C, same carriers or carriers in the same phase may be allocated for phase A and phase C while a further carrier in a phase different from the carrier of phase A and phase C is allocated to phase B. Since the phase voltages of phases A, B, and C are in an alternating state and their magnitude relation is constantly changing, the carriers allocated for respective phases should also be adjusted continuously, such that the carrier allocated to the phase having an intermediate voltage is in a phase constantly different from the carriers of the other two phases. On account of the changes in the carrier phase, the driving signal for the above rest phase should also be altered correspondingly, so as to reduce or eliminate the time periods when the driving signals of the upper arm switching device (or the lower arm switching device) are all at high level or low level. As such, the time period when the common-mode voltage is as high as $U_{bus}$/2 is avoided or decreased.

In some embodiments of the present disclosure, the phase difference between the carrier signals of the two of three phases and the carrier signal of the remaining phase is within a range from 150 degrees to 210 degrees. According to the study, if the carrier of the phase having an intermediate phase voltage is subject to a phase shift by an angle in a range from 150 degrees to 210 degrees, the switching state where the upper arm switching device (or lower arm switching device) of the three-phase switching branch is all turned on or off can be completely eliminated, so as to effectively lower the amplitude of the common-mode voltage.

In some embodiments of the present disclosure, the phase difference between the carrier signals of the two of three phases and the carrier signal of the remaining phase is 180 degrees. Specifically, the two carriers may have inverse phase relative to each other. In such case, one carrier may be directly obtained by subjecting the other carrier to an inverse operation. In this way, the carrier can be generated more simply and the control process is effectively simplified.

At block 903, the control device 200 generates, based on the determined carrier signals and the modulation wave signals of the three-phase switching branches, control signals of the three-phase switching branches. As an example, the comparison module 230A of the control device 200 compares the modulation wave Ma generated by the modulation wave generating module 210A with the carrier Ca generated by the carrier wave generating module 220 and generates the driving signals $V_{s1}$ and $V_{s2}$. The comparison module 230B compares the modulation wave Mb generated by the modulation wave generating module 210B with the carrier Cb generated by the carrier generating module 220 and generates the driving signals $V_{s3}$ and $V_{s4}$. The comparison module 230C compares the modulation wave Mc generated by the modulation wave generating module 210C with the carrier Cc generated by the carrier generating module 220 and generates the driving signals $V_{s5}$ and $V_{s6}$. The driving signals $V_{s1}$ to $V_{s6}$ are provided to the switching devices S1 to S6 of the three-phase switching branches of the converter 100, to implement the control over the converter 100.

Figure 10A:
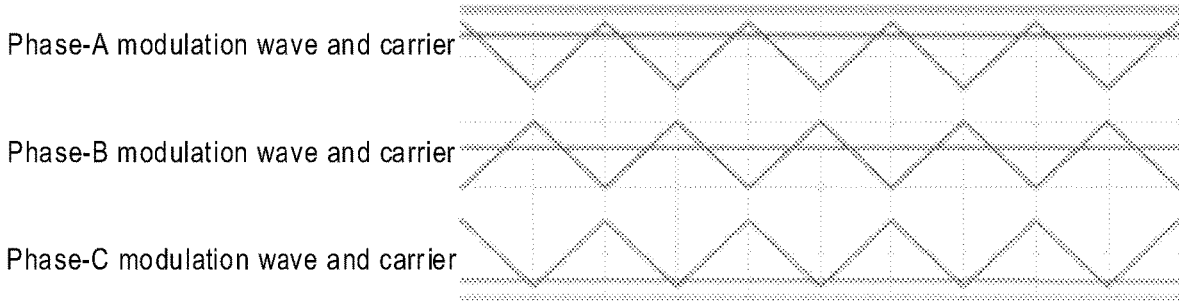
FIG. 10A illustrates a waveform of the modulation waves and the carrier waves of the control method in accordance with embodiments of the present disclosure.
Figure 10B:
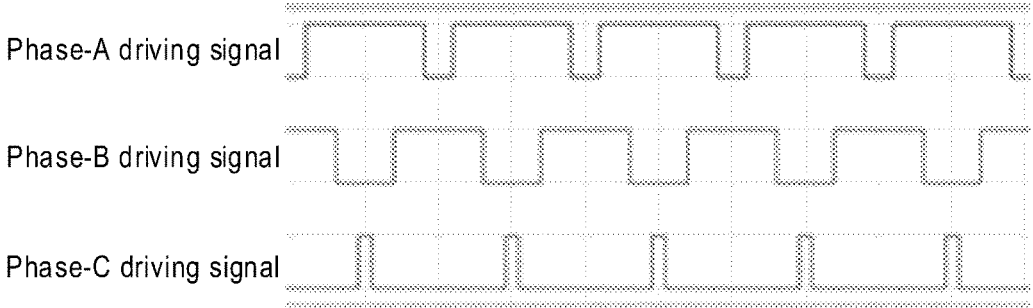
FIG. 10B illustrates a waveform of the three-phase driving signal of the control method in accordance with embodiments of the present disclosure.

FIG. 10A illustrates a waveform of the modulation wave signals and the carrier signals of the control method 900 in accordance with embodiments of the present disclosure, and FIG. 10B shows a waveform of the three-phase driving signals of the control method 900 in accordance with embodiments of the present disclosure. As shown in FIGS. 10A and 10B, when the current value of the modulation wave of phase B is between the current values of the modulation waves of phase A and phase C during this period of time, phase A and phase C are allocated with the first carrier, e.g., positive triangular carrier, while phase B is allocated with a second carrier in a phase different from the first carrier, such as negative triangular carrier in reverse phase with the positive triangular carrier. The driving signals of phases A, B, and C are respectively generated by comparing the modulation waves of phases A, B, and C with the corresponding carriers. It is known from FIG. 10B that the three-phase driving signals acquired by the control method 900 do not include the time period when the three phases are all high-level or low-level. That is, the time period when the upper arm switching device state (S1, S3, S5) is (0, 0, 0) and (1, 1, 1) has been completely removed through appropriate allocation of the carrier for the three phases.

Figure 11:
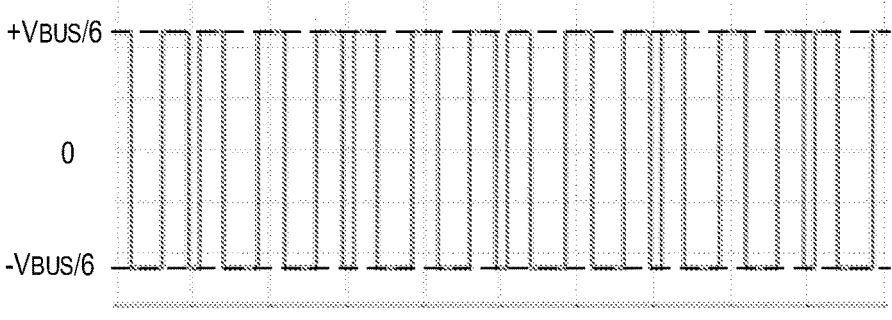
FIG. 11 illustrates a waveform of the common-mode voltage of the control method in accordance with embodiments of the present disclosure.

FIG. 11 illustrates a waveform of the common-mode voltage of the control method 900 in accordance with embodiments of the present disclosure. As shown, the common-mode voltage amplitude in the converter system 1000 after the control method 900 is applied decreases from $\pm U_{bus}/2$ in the conventional solution to $\pm U_{bus}/6$. This greatly reduces the common-mode voltage generated by the converter 100. As such, fewer EMI issues are caused by the common-mode noise, and the size and weight of the common-mode filter are reduced. Besides, the reduction in the common-mode voltage amplitude also may lower the device insulation requirement and further cut down the system overheads.

Figure 12:
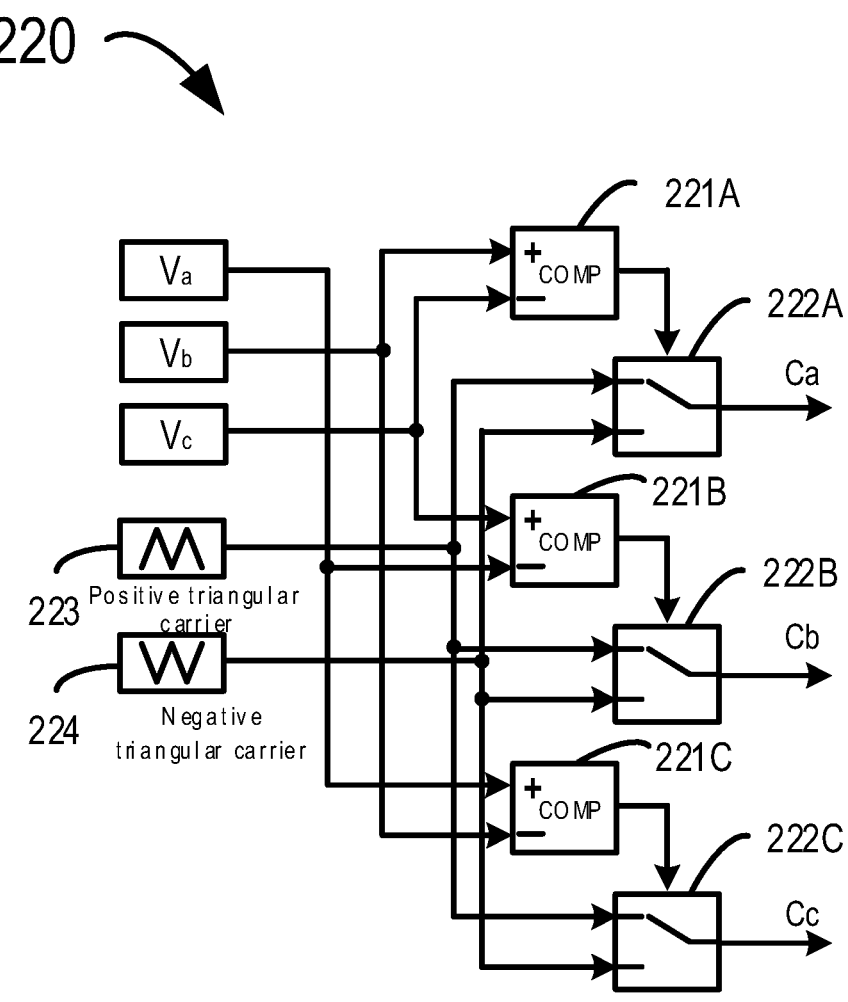
FIG. 12 illustrates a schematic block diagram of an implementation of the carrier generating module of the control device in accordance with embodiments of the present disclosure.

FIG. 12 illustrates a schematic block diagram of an implementation of the carrier generating module 220 of the control device 200. As shown, the carrier generating module 220 may include comparison units 221A, 221B, and 221C, switching units 222A, 222B, and 222C, a positive triangular carrier generating unit 223 and a negative triangular carrier generating unit 224. The comparison unit 221A and the switching unit 222A are provided for generating the carrier signal Ca for phase A, the comparison unit 221B and the switching unit 222B are provided for generating the carrier signal Cb for phase B, and the comparison unit 221C and the switching unit 222C are provided for generating the carrier signal Cc for phase C.

As to the phase-A switching branch, the comparison unit 221A compares the phase voltage of phase B and the phase voltage of phase C based on the received voltage signal representing the phase voltages of the three phases at the AC side of the converter 100. If the phase voltage of phase B is greater than that of phase C, the comparison unit 221A controls the switching unit 222A to switch the channel, such that the switching unit 222A determines the positive triangular carrier signal generated by the positive triangular carrier generating unit 223 as the carrier signal Ca of the phase-A switching branch. If the phase voltage of phase B is smaller than or equal to that of phase C, the comparison unit 221A controls the switching unit 222A to switch the channel, such that the switching unit 222A determines the negative triangular carrier signal generated by the negative triangular carrier generating unit 224 as the carrier signal Ca of the phase-A switching branch.

As to the phase-B switching branch, the comparison unit 221B compares the phase voltage of phase C and the phase voltage of phase A based on the received voltage signal representing the phase voltages of the three phases at the AC side of the converter 100. If the phase voltage of phase C is greater than that of phase A, the comparison unit 221B controls the switching unit 222B to switch the channel, such that the switching unit 222B determines the positive triangular carrier signal generated by the positive triangular carrier generating unit 223 as the carrier signal Cb of the phase-B switching branch. If the phase voltage of phase C is smaller than or equal to that of phase A, the comparison unit 221B controls the switching unit 222B to switch the channel, such that the switching unit 222B determines the negative triangular carrier signal generated by the negative triangular carrier generating unit 224 as the carrier signal Cb of the phase-B switching branch.

As to the phase-C switching branch, the comparison unit 221C compares the phase voltage of phase A and the phase voltage of phase B based on the received voltage signal representing the phase voltages of the three phases at the AC side of the converter 100. If the phase voltage of phase A is greater than that of phase B, the comparison unit 221C controls the switching unit 222C to switch the channel, such that the switching unit 222C determines the positive triangular carrier signal generated by the positive triangular carrier generating unit 223 as the carrier signal Cc of the phase-C switching branch. If the phase voltage of phase A is smaller than or equal to that of phase B, the comparison unit 221C controls the switching unit 222C to switch the channel, such that the switching unit 222C determines the negative triangular carrier signal generated by the negative triangular carrier generating unit 224 as the carrier signal Cc of the phase-C switching branch.

Figure 13:
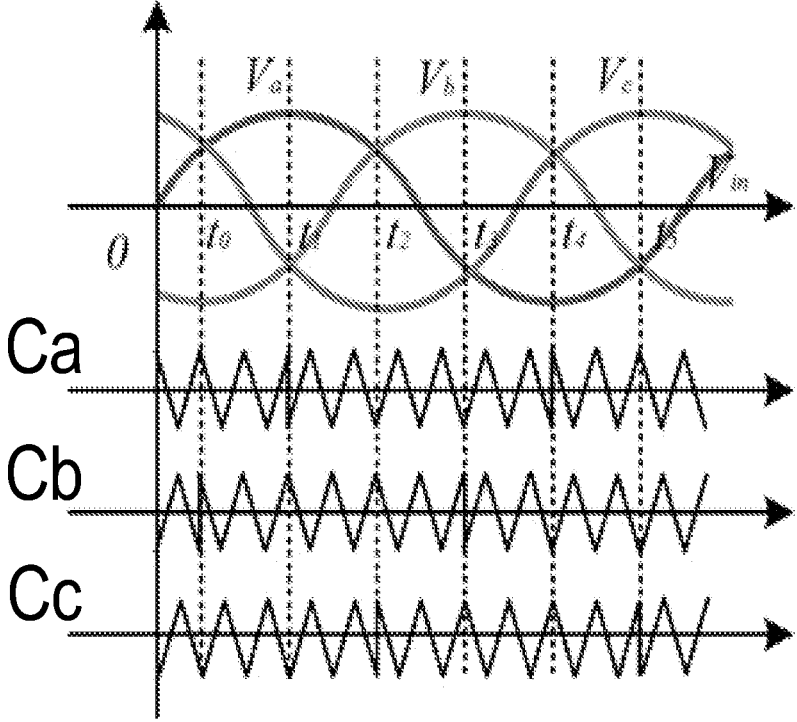
FIG. 13 illustrates a waveform of the carrier waves generated by the carrier generating module in accordance with embodiments of the present disclosure.

FIG. 13 illustrates a waveform of the carrier generated by the carrier generating module 220 in FIG. 12. At to, the phase voltage of phase C, which is greater than the phase voltage of phase A, is changed to be smaller than that. Accordingly, the carrier signal Cb of the phase-B switching branch changes from the positive triangular carrier to the negative triangular carrier. At $t_1$, the phase voltage of phase B, which is smaller than the phase voltage of phase C, is changed to be greater than that. As such, the carrier signal Ca of the phase-A switching branch changes from the negative triangular carrier to the positive triangular carrier. At $t_2$, the phase voltage of phase A, which is greater than the phase voltage of phase B, is changed to be smaller than that. Therefore, the carrier signal Cc of the phase-C switching branch changes from the positive triangular carrier to the negative triangular carrier. At $t_3$, the phase voltage of phase C, which is smaller than the phase voltage of phase A, is changed to be greater than that. As such, the carrier signal Cb of the phase-B switching branch changes from the negative triangular carrier to the positive triangular carrier.

At $t_4$, the phase voltage of phase B, which is greater than the phase voltage of phase C, is changed to be smaller than that. As such, the carrier signal Ca of the phase-A switching branch changes from the positive triangular carrier to the negative triangular carrier. At $t_5$, the phase voltage of phase A, which is smaller than the phase voltage of phase B, is changed to be greater than that. Therefore, the carrier signal Cc of the phase-C switching branch changes from the negative triangular carrier to the positive triangular carrier.

In this way, it is ensured that the carrier of the phase having an intermediate phase voltage has a phase inverse to or different from the carrier of the rest two phases. For example, in a period from $t_0$ to $t_1$, the phase voltage of phase C is between the phase voltage of phase A and the phase voltage of phase B, and the carrier Cc of phase C is a positive triangular carrier while the carrier Ca of phase A and the carrier Cb of phase B are negative triangular carrier. Accordingly, it is ensured that the state where the driving signals of the three phases are all at high level or low level will not occur in the period from $t_0$ to $t_1$. In addition, it is also ensured that only the carrier signal of one phase is altered at each switching. The control procedure thus is greatly simplified.

Figure 14:
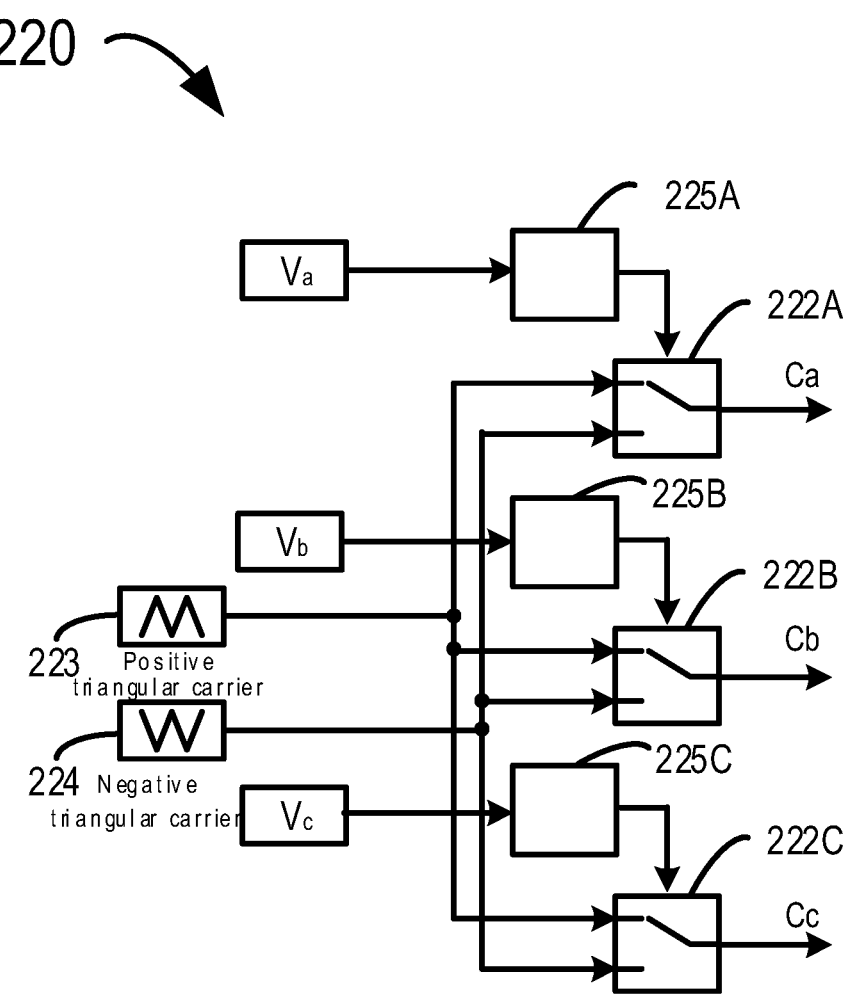
FIG. 14 illustrates a schematic block diagram of a further implementation of the carrier generating module of the control device in accordance with embodiments of the present disclosure.

FIG. 14 illustrates a schematic block diagram of a further implementation of the carrier generating module 220 of the control device 200. As shown in FIG. 14, the carrier generating module 220 may include voltage change determination units 225A, 225B, and 225C, switching units 222A, 222B, and 222C, the positive triangular carrier generating unit 223 and the negative triangular carrier generating unit 224. The voltage change determination unit 225A and the switching unit 222A are provided for generating the carrier signal Ca for phase A, the voltage change determination unit 225B and the switching unit 222B are provided for generating the carrier signal Cb for phase B, and the voltage change determination unit 225C and the switching unit 222C are provided for generating the carrier signal Cc for phase C.

For the phase-A switching branch, upon determining that the phase voltage of phase A among the phase voltages of the three phases is declining, the voltage change determination unit 225A controls the switching unit 222A to determine a positive triangular carrier signal generated by the positive triangular carrier generating unit 223 as the carrier signal Ca of the phase-A switching branch; otherwise, the voltage change determination unit 225A controls the switching unit 222A to determine a negative triangular carrier signal generated by the negative triangular carrier generating unit 224 as the carrier signal Ca of the phase-A switching branch. For the phase-B switching branch, upon determining that the phase voltage of phase B among the phase voltages of the three phases is declining, the voltage change determination unit 225B controls the switching unit 222B to determine a positive triangular carrier signal generated by the positive triangular carrier generating unit 223 as the carrier signal Cb of the phase-B switching branch; otherwise, the voltage change determination unit 225B controls the switching unit 222B to determine a negative triangular carrier signal generated by the negative triangular carrier generating unit 224 as the carrier signal Cb of the phase-B switching branch. For the phase-C switching branch, upon determining that the phase voltage of phase C among the phase voltages of the three phases is declining, the voltage change determination unit 225C controls the switching unit 222C to determine a positive triangular carrier signal generated by the positive triangular carrier generating unit 223 as the carrier signal Cc of the phase-C switching branch; otherwise, the voltage change determination unit 225C controls the switching unit 222C to determine a negative triangular carrier signal generated by the negative triangular carrier generating unit 224 as the carrier signal Cc of the phase-C switching branch. In this way, the carrier signal combination shown in FIG. 13 can also be implemented. Accordingly, the common-mode voltage of the converter is lowered by a simple and efficient control approach.

Figure 15A:
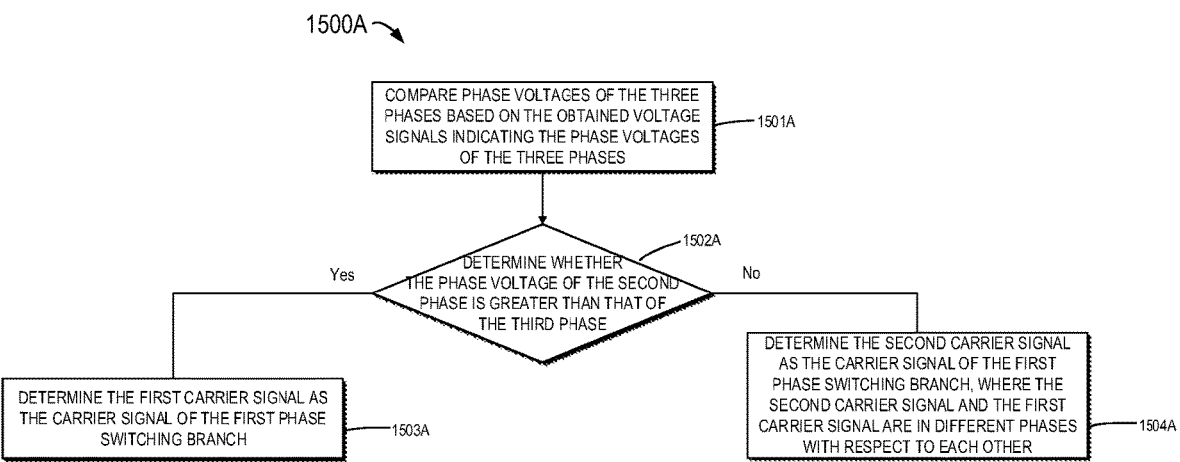
FIGS. 15A, 15B, and 15C illustrate schematic flowcharts of example procedures for generating carrier signals in accordance with embodiments of the present disclosure.
Figure 15B:
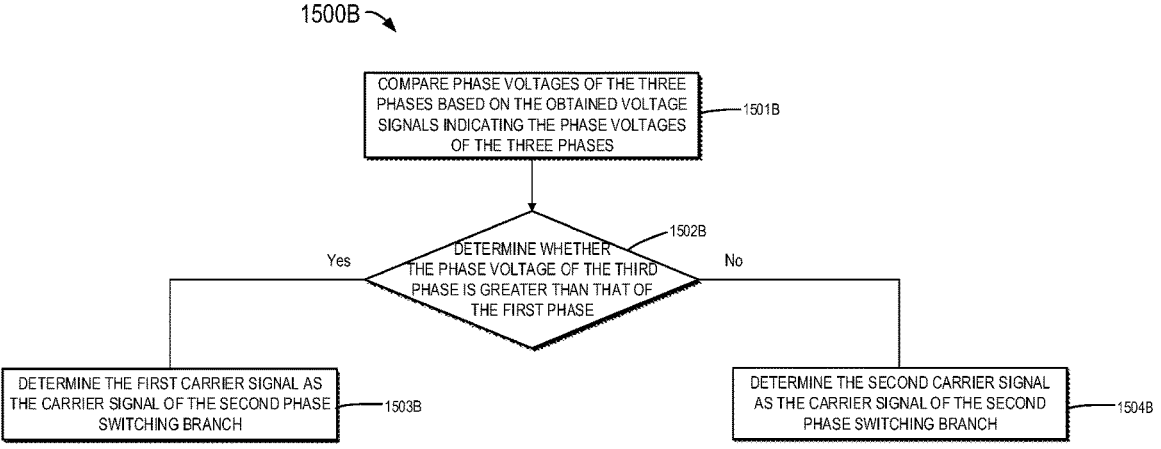
Figure 15C:
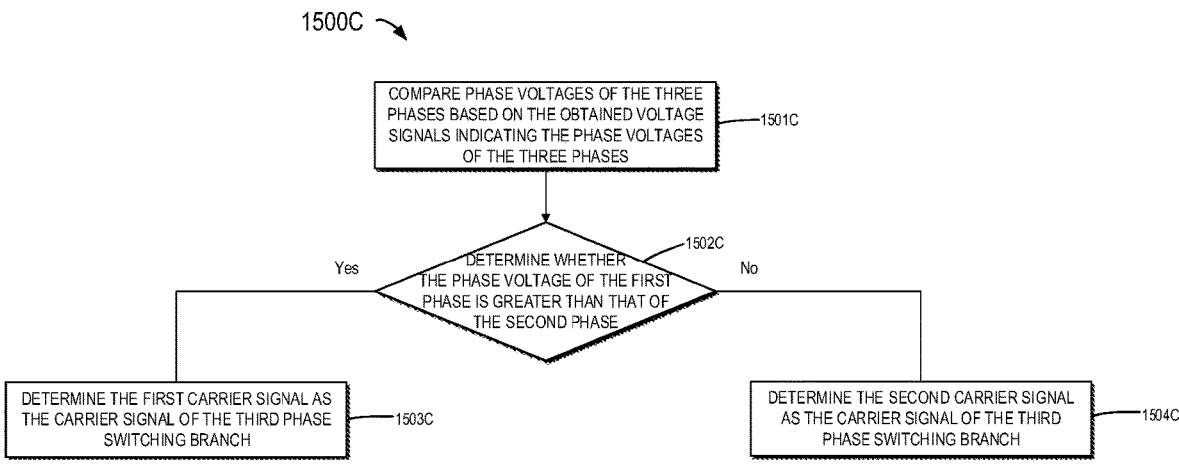

FIGS. 15A-15C illustrate schematic flowcharts of example procedures 1500A, 1500B, and 1500C for generating carrier signals Ca, Cb, and Cc. The procedures demonstrated by FIGS. 15A-15C may be implemented at block 902 of FIG. 9.

As shown in FIG. 15A, the procedure 1500A depicts an example procedure for determining the carrier signal Ca of the first phase switching branch.

At block 1501A, the control device 200 compares phase voltages of the three phases based on the obtained voltage signals indicating the phase voltages of the three phases.

At block 1502A, the control device 200 determines whether the phase voltage of the second phase is greater than that of the third phase.

At block 1503A, in response to the phase voltage of the second phase being greater than that of the third phase, the control device 200 determines the first carrier signal as the carrier signal Ca of the first phase switching branch.

At block 1504A, in response to the phase voltage of the second phase being no greater than that of the third phase, the control device 200 determines the second carrier signal as the carrier signal Ca of the first phase switching branch, where the second carrier signal and the first carrier signal are in different phases with respect to each other.

As shown in FIG. 15B, the procedure 1500B demonstrates an example procedure for determining the carrier signal Cb of the second phase switching branch.

At block 1501B, the control device 200 compares phase voltages of the three phases based on the obtained voltage signals indicating the phase voltages of the three phases.

At block 1502B, the control device 200 determines whether the phase voltage of the third phase is greater than that of the first phase.

At block 1503B, in response to the phase voltage of the third phase being greater than that of the first phase, the control device 200 determines the first carrier signal as the carrier signal Cb of the second phase switching branch.

At block 1504B, in response to the phase voltage of the third phase being no greater than that of the first phase, the control device 200 determines the second carrier signal as the carrier signal Cb of the second phase switching branch, where the second carrier signal and the first carrier signal are in different phases with respect to each other.

As shown in FIG. 15C, the procedure 1500C depicts an example procedure for determining the carrier signal Cc of the third phase switching branch.

At block 1501C, the control device 200 compares phase voltages of the three phases based on the obtained voltage signals indicating the phase voltages of the three phases.

At block 1502C, the control device 200 determines whether the phase voltage of the first phase is greater than that of the second phase.

At block 1503C, in response to the phase voltage of the first phase being greater than that of the second phase, the control device 200 determines the first carrier signal as the carrier signal Cc of the third phase switching branch.

At block 1504C, in response to the phase voltage of the first phase being no greater than that of the second phase, the control device 200 determines the second carrier signal as the carrier signal Cc of the third phase switching branch, where the second carrier signal and the first carrier signal are in different phases with respect to each other.

Figure 16:
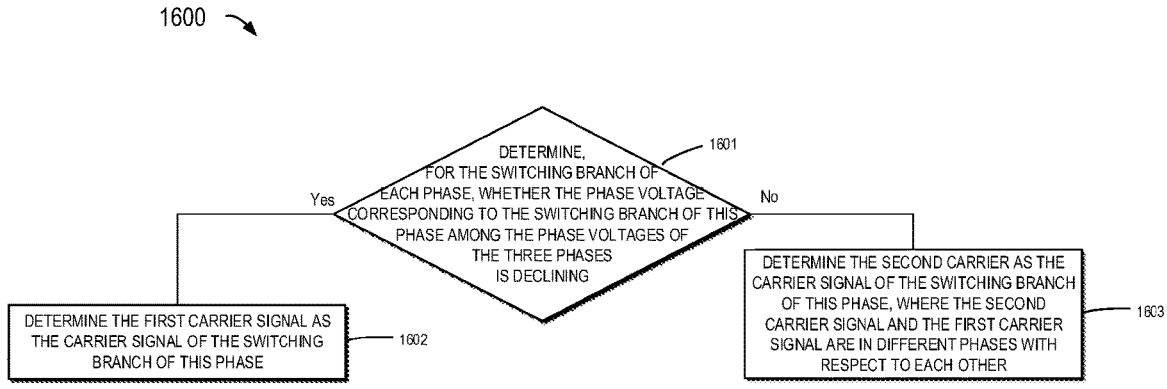
FIG. 16 illustrates an example flowchart of an example procedure for generating the carrier signals in accordance with embodiments of the present disclosure.

FIG. 16 illustrates an example flowchart of an example procedure 1600 for generating the carrier signals Ca, Cb, and Cc. The procedure shown in FIG. 16 may be implemented at block 902 of FIG. 9.

At block 1601, the control device 200 determines, for the switching branch of each phase, whether the phase voltage corresponding to the switching branch of this phase among the phase voltages of the three phases is declining.

At block 1602, in response to the phase voltage corresponding to switching branch of this phase being declining, the control device 200 determines the first carrier signal as the carrier signal of the switching branch of this phase.

At block 1603, in response to the phase voltage corresponding to the switching branch of this phase being not declining, the second carrier signal is determined as the carrier signal of the switching branch of this phase, where the second carrier signal and the first carrier signal are in different phases with respect to each other.

It is to be understood that although embodiments of the present disclosure have been schematically described with reference to the converter system in a rectification mode under the first scenario, the embodiments of the present disclosure also are applicable to the converter system in an inverter mode. Besides, embodiments of the present disclosure also are adapted to other converter systems utilizing a modulation wave generation approach different from the one shown in FIG. 5. In other words, the solution of the present disclosure may be applied to any converter systems in which the converter is controlled by modulation waves and carrier waves and the common-mode voltage may possibly exist.

Figure 17:
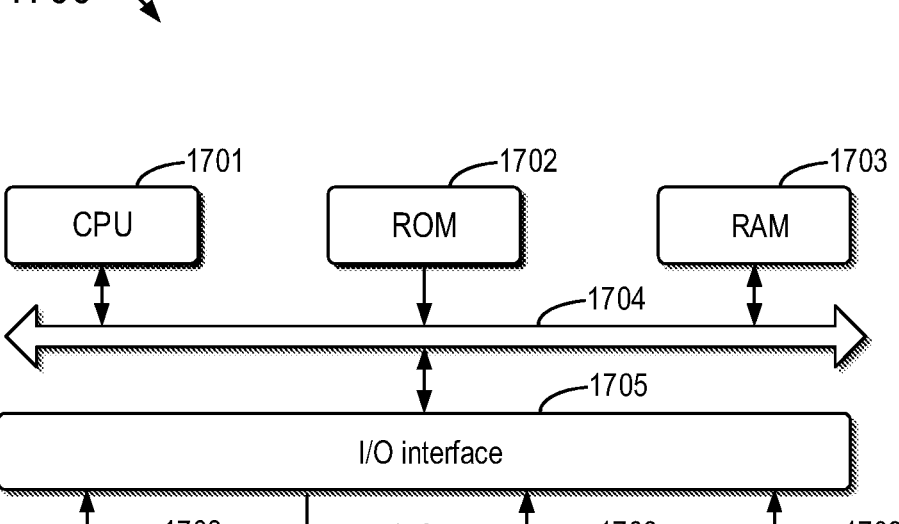
FIG. 17 illustrates a schematic block diagram of an example device for implementing embodiments of the present disclosure.

FIG. 17 illustrates a schematic block diagram of an example device 1700 for implementing embodiments of the present disclosure. The device 1700 may be implemented as a control device in FIGS. 1, 2, and 4. The control device 200 may be provided for realizing the method according to FIG. 9.

As shown in FIG. 10, the device 1700 includes a central process unit (CPU) 1701, which can execute various suitable actions and processing based on the computer program instructions stored in the read-only memory (ROM) 1702 or computer program instructions loaded to the random-access memory (RAM) 1703 from the storage unit 1708. The RAM 1703 can also store all kinds of programs and data required by the operation of the device 1700, e.g., the measurement data mentioned above. CPU 1701, ROM 1702, and RAM 1703 are connected to each other via a bus 1704. The input/output (I/O) interface 1705 is also connected to the bus 1704.

A plurality of components in the device 1700 is connected to the I/O interface 1705, including an input unit 1706, an output unit 1707, a storage unit 1708, and a communication unit 1709. The communication unit 1709 allows the device 1700 to exchange information/data with other devices via the wired or wireless communication links.

The above-described procedure and processing, such as method 900, can be executed by the processing unit 1701. For example, in some embodiments, the method 900 can be implemented as a computer software program or a computer program product tangibly included in the machine-readable medium, e.g., non-transitory computer-readable medium or storage unit 1708. In some embodiments, the computer program can be partially or fully loaded and/or mounted to the device 1700 via ROM 1702 and/or communication unit 1709. When the computer program is loaded to RAM 1703 and executed by the CPU 1701, one or more actions of the above-described method 900 can be implemented. Alternatively, in other embodiments, the CPU 1701 may be configured via any other suitable manners (such as by means of firmware) to perform the method 900.

Those skilled in the art should understand respective steps of the above disclosed method can be implemented by a general-purpose computing apparatus. They may be integrated on a single computing apparatus or distributed in a network included of a plurality of computing apparatuses. They may be implemented by program codes executable by the computing apparatus. Accordingly, they may be stored in a storage device and executed by the computing apparatus, or separately fabricated as respective integrated circuit modules. Alternatively, a plurality of modules or steps therein is manufactured into a single integrated circuit module for implementation. Thus, the present disclosure is not limited to any particular combinations of hardware and software.

It is to be appreciated that although several apparatuses or sub-apparatuses of the device have been mentioned in the above detailed description, such classification is just exemplary and non-compulsory. In fact, in accordance with embodiments of the present disclosure, features and functions of the above-described two or more apparatuses may be materialized in one apparatus. Conversely, features and functions of one apparatus described above may be further realized by a plurality of apparatuses.

The above-described embodiments are examples and should not restrict the present disclosure. For those skilled in the art, the present disclosure may have various modifications and changes. Any modifications, equivalent substitutions and improves should be encompassed within the protection scope of the present disclosure as long as they are within the spirit and principle.

What is claimed is:

1. A method for controlling a converter, the method comprising:

obtaining voltage signals indicating phase voltages of three phases at an AC side of the converter;

determining, based on the voltage signals, carrier signals of three-phase switching branches of the converter, wherein carrier signals of two of the three phases have the same phase with each other and have a different phase from a carrier signal of the remaining phase of the three phases, and wherein a magnitude of a phase voltage of the remaining phase is between the phase voltages of the two of the three phases; and generating, based on the determined carrier signals and modulation wave signals of the three-phase switching branches, control signals of the three-phase switching branches, wherein determining, based on the voltage signals, the carrier signals of the three-phase switching branches of the converter comprises:

for a switching branch of each phase:

in response to the phase voltage corresponding to the switching branch of this phase among the phase voltages of the three phases declining, determining a first carrier signal as a carrier signal of the switching branch of this phase; or in response to the phase voltage corresponding to the switching branch of this phase not declining, determining a second carrier signal as the carrier signal of the switching branch of this phase, wherein the second carrier signal and the first carrier signal are in different phases with respect to each other.

2. The method of claim 1, wherein a difference between the phase of the carrier signals of the two of the three phases and the phase of the carrier signal of the remaining phase is within a range from 150 degrees to 210 degrees.

3. The method of claim 2, wherein the difference between the phase of the carrier signals of the two of the three phases and the phase of the carrier signal of the remaining phase is 180 degrees.

4. The method of claim 1, wherein the voltage signals indicating the phase voltages of the three phases include modulation wave signals of the three-phase switching branches.

5. The method of claim 1, wherein the voltage signals indicating the phase voltages of the three phases include sensing signals of AC-side supply voltage of the converter.

6. The method of claim 1, wherein the converter is a rectifier and wherein the modulation wave signals are determined based on a DC side voltage, an AC side supply voltage, and an AC side inductive current of the rectifier.

7. The method of claim 1, wherein generating, based on the determined carrier signals and the modulation wave signals of the three-phase switching branches, the control signals of the three-phase switching branches comprises:

generating, based on a comparison between the determined carrier signals and the modulation wave signals, pulse-width modulated signals as the control signals of the three-phase switching branches.

8. A converter system comprising:

a converter; and a control device for controlling the converter, wherein the control device is configured to:

obtain voltage signals indicating phase voltages of three phases at an AC side of the converter;

determine, based on the voltage signals, carrier signals of three-phase switching branches of the converter, wherein carrier signals of two of the three phases have the same phase with each other and have a different phase from a carrier signal of the remaining phase of the three phases, and wherein magnitude of a phase voltage of the rest phase is between the phase voltages of the two of the three phases; and generate, based on the determined carrier signals and modulation wave signals of the three-phase switching branches, control signals of the three-phase switching branches, wherein determining, based on the voltage signals, the carrier signals of the three-phase switching branches of the converter comprises:

for a switching branch of each phase:

in response to a phase voltage corresponding to the switching branch of this phase among the phase voltages of the three phases declining, determining a first carrier signal as a carrier signal of the switching branch of this phase; or in response to the phase voltage corresponding to the switching branch of this phase not declining, determining a second carrier signal as the carrier signal of the switching branch of this phase, wherein the second carrier signal and the first carrier signal are in different phases with respect to each other.

9. The converter system of claim 8, wherein a difference between the phase of the carrier signals of the two of the three phases and the phase of the carrier signal of the remaining phase is within a range from 150 degrees to 210 degrees.

10. The converter system of claim 9, wherein the difference between the phase of the carrier signals of the two of the three phases and the phase of the carrier signal of the remaining phase is 180 degrees.

11. The converter system of claim 8, wherein the voltage signals indicating the phase voltages of the three phases include modulation wave signals of the three-phase switching branches.

12. The converter system of claim 8, wherein the voltage signals indicating the phase voltages of the three phases include sensing signals of AC-side supply voltage of the converter.

13. The converter system of claim 8, wherein the converter is a rectifier and wherein the modulation wave signals are determined based on a DC side voltage, an AC side supply voltage, and an AC side inductive current of the rectifier.

14. The converter system of claim 8, wherein generating, based on the determined carrier signals and the modulation wave signals of the three-phase switching branches, the control signals of the three-phase switching branches comprises:

generating, based on a comparison between the determined carrier signals and the modulation wave signals, pulse-width modulated signals as the control signals of the three-phase switching branches.

15. A method for controlling a converter, the method comprising:

obtaining voltage signals indicating phase voltages of three phases at an AC side of the converter;

determining, based on the voltage signals, carrier signals of three-phase switching branches of the converter, wherein carrier signals of two of the three phases have the same phase with each other and have a different phase from a carrier signal of the remaining phase of the three phases, and wherein a magnitude of a phase voltage of the remaining phase is between the phase voltages of the two of the three phases; and generating, based on the determined carrier signals and modulation wave signals of the three-phase switching branches, control signals of the three-phase switching branches, wherein determining, based on the voltage signals, the carrier signals of the three-phase switching branches of the converter comprises:

comparing, based on the voltage signals, phase voltages of the three phases; and for a first phase switching branch:

in response to a phase voltage of a second phase being greater than that of a third phase, determining a first carrier signal as a carrier signal of the first phase switching branch; or in response to the phase voltage of the second phase being no greater than that of the third phase, determining a second carrier signal as the carrier signal of the first phase switching branch, wherein the second carrier signal and the first carrier signal are in different phases with respect to each other;

for a second phase switching branch:

in response to the phase voltage of the third phase being greater than that of a first phase, determining the first carrier signal as a carrier signal of the second phase switching branch; or in response to the phase voltage of the third phase being no greater than that of the first phase, determining the second carrier signal as the carrier signal of the second phase switching branch;

for a third phase switching branch:

in response to the phase voltage of the first phase being greater than that of the second phase, determining the first carrier signal as a carrier signal of the third phase switching branch; or in response to the phase voltage of the first phase being no greater than that of the second phase, determining the second carrier signal as the carrier signal of the third phase switching branch.

16. The method of claim 15, wherein a difference between the phase of the carrier signals of the two of the three phases and the phase of the carrier signal of the remaining phase is within a range from 150 degrees to 210 degrees.

17. A converter system comprising:

a converter; and a control device for controlling the converter, wherein the control device is configured to:

obtain voltage signals indicating phase voltages of three phases at an AC side of the converter;

determine, based on the voltage signals, carrier signals of three-phase switching branches of the converter, wherein carrier signals of two of the three phases have the same phase with each other and have a different phase from a carrier signal of the remaining phase of the three phases, and wherein magnitude of a phase voltage of the rest phase is between the phase voltages of the two of the three phases; and generate, based on the determined carrier signals and modulation wave signals of the three-phase switching branches, control signals of the three-phase switching branches, wherein determining, based on the voltage signals, the carrier signals of the three-phase switching branches of the converter comprises:

comparing, based on the voltage signals, phase voltages of the three phases; and for a first phase switching branch:

in response to a phase voltage of a second phase being greater than that of a third phase, determining a first carrier signal as a carrier signal of the first phase switching branch; or in response to the phase voltage of the second phase being no greater than that of the third phase, determining a second carrier signal as the carrier signal of the first phase switching branch, wherein the second carrier signal and the first carrier signal are in different phases with respect to each other;

for a second phase switching branch:

in response to the phase voltage of the third phase being greater than that of a first phase, determining the first carrier signal as a carrier signal of the second phase switching branch; or in response to the phase voltage of the third phase being no greater than that of the first phase, determining the second carrier signal as the carrier signal of the second phase switching branch;

for a third phase switching branch:

in response to the phase voltage of the first phase being greater than that of the second phase, determining the first carrier signal as the carrier signal of the third phase switching branch; or in response to the phase voltage of the first phase being no greater than that of the second phase, determining the second carrier signal as the carrier signal of the third phase switching branch.

18. The converter system of claim 17, wherein a difference between the phase of the carrier signals of the two of the three phases and the phase of the carrier signal of the remaining phase is within a range from 150 degrees to 210 degrees.

* * * * *